March 16, 1943.  L. H. GARLINGHOUSE  2,313,868
ACETYLENE TANK CART
Filed Feb. 16, 1942  2 Sheets-Sheet 2
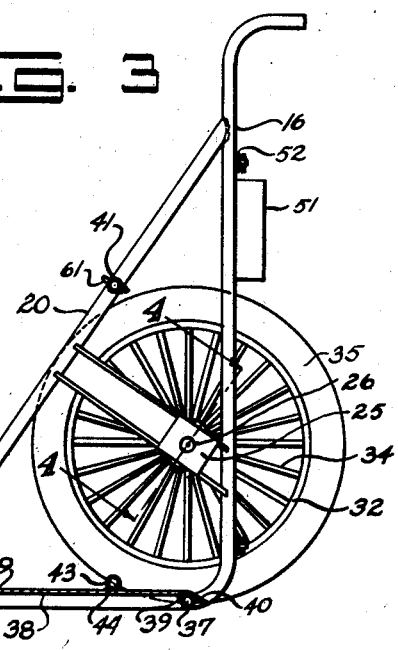
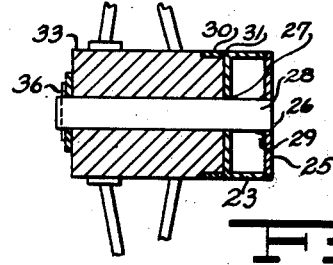
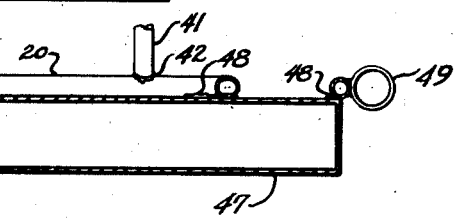
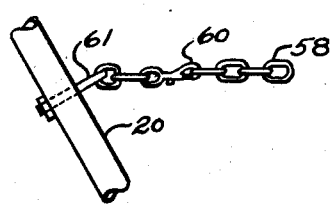
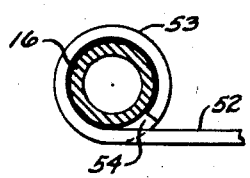
INVENTOR.
L. H. GARLINGHOUSE
BY B. J. Craig,
ATTORNEY Patented Mar. 16, 1943

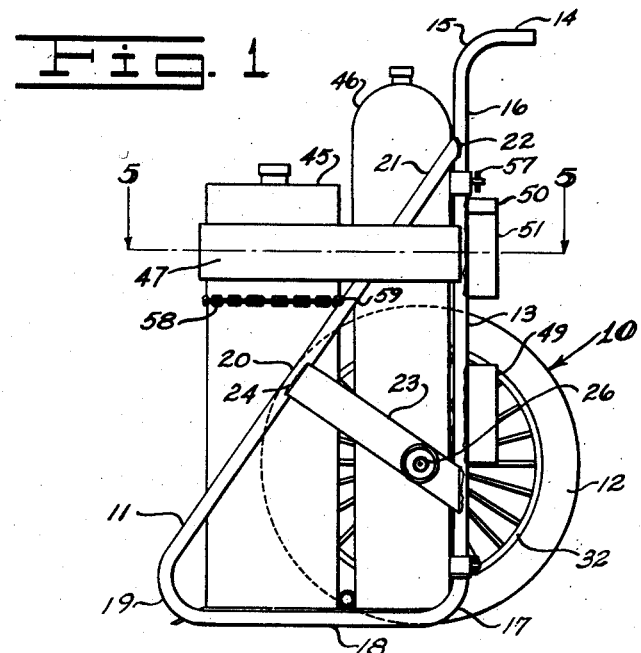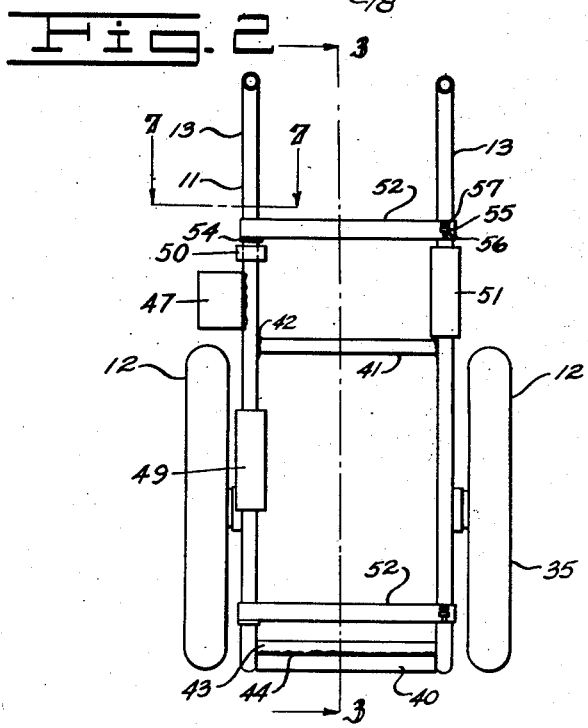

2,313,868

UNITED STATES PATENT OFFICE 2,313,868

ACETYLENE TANK CART

Leslie H. Garlinghouse, Los Angeles, Calif.

Application February 16, 1942, Serial No. 431,049

7 Claims. (Cl. 280—53)

This invention relates to acetylene tank carts.

The general object of the invention is to provide an improved welding tank cart wherein novel means is provided whereby tanks such as oxygen and acetylene tanks may be arranged in tandem relation.

The practice heretofore has been to provide a tank support wherein the tanks are arranged side by side. This requires that the cart have considerable width and has caused much trouble and inconvenience since the carts cannot be moved through narrow doors or passageways, and it is an object of my present invention to provide a cart which is narrow and wherein the oxygen and acetylene tanks may be readily placed upon and removed from the cart.

A more specific object of my invention is to provide a novel frame for a welding tank cart.

Another object of my invention is to provide a welding tank cart wherein novel means is provided for supporting the tanks.

Another object of my invention is to provide a novel chassis for a welding tank cart.

Other objects and advantages of my invention will be apparent from the following description taken in connection with the accompanying drawings, wherein:

Fig. 1 is a side elevation showing a welding tank cart with the left hand wheel removed, and showing features of my invention;

Fig. 2 is a rear elevation;

Fig. 3 is a sectional view taken along line 3—3 in Fig. 2;

Fig. 4 is a sectional detail taken on line 4—4 in Fig. 3;

Fig. 5 is a sectional detail taken along line 5—5 in Fig. 1;

Fig. 6 is a detail showing the securing chain; and

Fig. 7 is an enlarged section taken on line 7—7, Fig. 2.

Referring to the drawings by reference character, I have shown my invention as embodied in a tandem welding tank cart which is indicated generally at 10. As shown, the cart includes a chassis 11 and supporting wheels 12. The chassis as shown is made of tubular metal such as pipe and includes a pair of spaced side members 13. Each side member 13 includes an upper hand grip portion 14 which is horizontally arranged and is connected by a curved portion 15 with a vertical portion 16. The portion 16 is connected to a curved portion 17 by a horizontal foot portion 18. The foot portion 18 is connected by a curved portion 19 with an inclined brace portion 20, the end 21 of which is welded as at 22 to the vertical portion 16.

The inclined portion 20 and the vertical portion 16 of each side member are connected by a channel or axle supporting member 23 with the channel flanges directed inwardly and engaging, and welded to, the portions 13 and 20 as at 24.

Adjacent the vertical portions 16 I secure plates 25 on the flanges of each channel member. These plates are provided with apertures 26 which align with apertures 27 in the associated channel member and in each of the apertures 26 and 27 I arrange a stub axle 28 which is secured in place as by welding at 29. Each of the channels includes a collar 30 held in place by welding as at 31. Mounted upon each stub shaft I show a wheel 32 which includes a hub 33, spokes 34 and a pneumatic tire 35. The wheels 32 are held in place by means shown as fastening pins 36.

The foot portions 18 of the two side members are connected by spaced transverse members 37 arranged adjacent the front and back of the foot members. The members 37 support a platform 38 welded in place as at 39. The platform includes downwardly inclined front and rear portions 40 which permit easy loading upon the platform.

Intermediate the length of the inclined brace portions 20, I arrange a partition forming and tank engaging transverse member 41 which is secured in place as by welding as at 42, and upon the platform 38 I arrange a second partition forming and tank engaging transverse member 43 which is held in place as by welding as at 44. The partition forming members 41 and 43 are vertically aligned and are adapted to be engaged by tanks 45 and 46 which rest upon the platform 38 as shown in Fig. 1.

The axles 28 are so arranged that the periphery of the tire 35 when the cart is loaded, the lower surface of the foot members 18 will be below the tire periphery so that the cart will rest upon the members 18.

Situated above the periphery of one of the tires 35 I provide a tool box 47 secured to the side member 13 as by welding at 48. The box 47 is arranged horizontally with an open side at the top.

At the rear of the vertical portion 16 of one of the side members 13, I fasten a tubular container 49 which serves to hold long welding rods. Above the container 49 a guide 50 in the form of a loop is attached to the portion 16 of the side member 13. This loop serves as a support for the upper ends of the long welding rods. On the other side member I arrange a tubular container 51 for short welding rods.

To hold the tank 46 in place, I provide a pair of retaining members 52 each of which includes an integral eye 53 surrounding one of the members. A collar 54 below each eye 53 prevents downward movement of the member 52. At the end remote from the eye 53 each retaining member includes a slot 55 through which an apertured pin 56 extends. A beaded securing member 57 passes through the aperture in each pin 56 to hold the retaining member in place.

To hold the tank 45 in place, I provide a chain 58 secured at one end 59 to one of the portions 20. The other end of the chain engages a snap fastener 60 secured by a fastening member 61 to the other portion 20.

From the foregoing description it will be apparent that I have invented a novel tandem tank cart which can be economically manufactured and which is highly efficient for its intended purpose.

Having thus described my invention, I claim:

1. In a tandem tank cart, a chassis including spaced side members, each of said side members including a vertical portion, a foot portion and a brace portion, an axle supporting member secured to the brace portion and the vertical portion on each side of the chassis, a platform supported by said foot portion, a partition forming and tank engaging transverse member extending across the cart above the platform and dividing the platform into a front portion and a rear portion, a stub axle mounted on each of said axle supporting members and extending outwardly therefrom, said stub axles being arranged intermediate the length of the rear portion of the platform and above the platform, and a wheel on each axle.

2. In a tandem tank cart, a chassis including spaced side members, each of said side members including a vertical portion, a foot portion and a brace portion secured to the foot portion and to the vertical portion, an axle supporting member extending diagonally downwardly and rearwardly from the brace portion to the vertical portion on each side of the chassis, spaced transverse members connecting the vertical portions and the back of the foot portions, a platform mounted on said spaced transverse members, said platform having inclined front and rear aprons, a partition forming and tank engaging transverse member connecting said brace portions intermediate the length thereof, an axle mounted on each of said axle supporting members, and a wheel on each axle.

3. In a tandem tank cart, a chassis including spaced side members, each of said side members including a vertical portion, a horizontal foot portion secured to the vertical portion, and an inclined brace portion secured to the foot portion and to the vertical portion, an axle supporting member extending diagonally downwardly and rearwardly from the brace portion to the vertical portion on each side of the chassis, a pair of spaced retaining bars pivoted on one of said vertical portions and extending to the other vertical portion and releasably connected thereto, spaced transverse members connecting the vertical portions and the back of the foot portions, a platform mounted on said spaced transverse members, a partition forming and tank engaging transverse member connecting said brace portions intermediate the length thereof, an axle mounted on each of said axle supporting members, a wheel on each axle, and a tire on each wheel.

4. In a tandem tank cart, a chassis including spaced side members, each of said side member including a vertical portion, a horizontal foot portion secured to the vertical portion, and an inclined brace portion secured to the foot portion and to the vertical portion, an axle supporting member extending diagonally downwardly and rearwardly from the brace portion to the vertical portion on each side of the chassis, a pair of spaced retaining bars pivoted on one of said vertical portions and extending to the other vertical portion and releasably connected thereto, spaced transverse members connecting the vertical portions and the back of the foot portions, a platform mounted on said spaced transverse portions, said platform having inclined front and rear aprons, a partition forming and tank engaging transverse member connecting said brace portions intermediate the length thereof, a second partition forming and tank engaging transverse member on said platform and aligned vertically with said first partition forming transverse member, an axle mounted on each of said axle supporting members, said axles being directed outwardly, a wheel on each axle, a tire on each wheel, the periphery of the tire being disposed above the bottom of said foot portions.

5. In a tandem tank cart, a chassis including a pair of spaced side members, each of said side members including a hand grip portion having a vertical portion secured thereto, a horizontal foot portion secured to the vertical portion, an inclined brace portion secured to the foot portion, the upper end of the brace portion being secured to the vertical portion adjacent the upper end thereof, a channel member on each side of the chassis and extending from the brace portion to the vertical portion on each side of the chassis, each channel member having its flanges engaging the associated brace portion and vertical portion, a plate member secured to each channel adjacent the associated vertical portion, a pair of spaced retaining bars pivoted on one of said vertical portions and extending to the other vertical portion and releasably connected thereto, spaced transverse members connecting the front and the back of the foot portions, a platform mounted on said spaced transverse portions, a partition forming and tank engaging transverse member connecting said brace portions intermediate the length thereof, a second partition forming and tank engaging transverse member on said platform and aligned vertically with said first partition forming transverse member, a pair of stub axles, one mounted on each of said channel and plate members, said axles being directed outwardly, a wheel on each axle, and a tire on each wheel, the periphery of the tire being disposed above the bottom of said foot portions.

6. In a tandem tank cart, a chassis including a pair of spaced side members, each of said side members including a horizontal hand grip portion having a vertical portion secured thereto, a horizontal foot portion secured to the vertical portion, an inclined brace portion secured to the foot portion, the upper end of the brace portion being secured to the vertical portion adjacent the upper end thereof, a channel member on each side of the chassis and extending diagonally downwardly and rearwardly from the brace portion to the vertical portion, each channel member having its flanges engaging the associated brace portion and vertical portion, a plate secured to each channel adjacent the associated vertical portion, each channel and its associated plate having aligned apertures, a pair of spaced retaining bars pivoted on one of said vertical portions and extending to the other vertical portion and releasably connected thereto, spaced transverse members connecting the front and the back of the foot portions, a platform mounted on said spaced transverse portions, said platform having inclined front and rear aprons, a partition forming and tank engaging transverse member connecting said brace portions intermediate the length thereof, a second partition forming and tank engaging transverse member on said platform and aligned vertically with said first partition forming transverse member, a pair of stub axles, one mounted in each of said channel and plate apertures, said axles being directed outwardly, a wheel on each axle, a tire on each wheel, the periphery of the tire being disposed above the bottom of said foot portions, and means to hold a tank in place on the front portion of said platform.

7. In a tandem tank cart, a chassis including spaced side members, each of said side members including a vertical portion, a foot portion and a brace portion secured to the foot portion and to the vertical portion, an axle supporting member at each side of the chassis, said axle supporting members extending from the brace portion to the vertical portion, spaced transverse members connecting the vertical portions and the back of the foot portions, a platform mounted on said spaced transverse members, a partition forming and tank engaging transverse member extending across said chassis, said last mentioned member being disposed above said platform and being engageable by an object on the front and an object on the back of said platform, an axle mounted on each of said axle supporting members, and a wheel on each axle.

LESLIE H. GARLINGHOUSE.